(12) United States Patent
Moreton et al.

(10) Patent No.: US 6,731,298 B1
(45) Date of Patent: May 4, 2004

(54) SYSTEM, METHOD AND ARTICLE OF MANUFACTURE FOR Z-TEXTURE MAPPING

(75) Inventors: Henry P. Moreton, Woodside, CA (US); John Erik Lindholm, Cupertino, CA (US); Matthew N. Papakipos, Palo Alto, CA (US); Harold Robert Feldman Zatz, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 314 days.

(21) Appl. No.: 09/678,111

(22) Filed: Oct. 2, 2000

(51) Int. Cl.[7] .............................................. G06T 11/40
(52) U.S. Cl. ....................................... 345/584; 345/582
(58) Field of Search ................................. 345/582, 583, 345/584, 585

(56) References Cited

U.S. PATENT DOCUMENTS

| | | | |
|---|---|---|---|
| 5,808,619 A | 9/1998 | Choi et al. | 345/426 |
| 5,880,736 A | 3/1999 | Peercy et al. | 345/426 |
| 5,949,424 A | 9/1999 | Cabral et al. | 345/426 |
| 5,974,168 A | 10/1999 | Rushmeier et al. | 382/141 |
| 6,078,334 A * | 6/2000 | Hanaoka et al. | 345/430 |

* cited by examiner

*Primary Examiner*—Matthew C. Bella
*Assistant Examiner*—Kevin M. Nguyen
(74) *Attorney, Agent, or Firm*—Silicon Valley IP Group, PC; Kevin J. Zilka

(57) ABSTRACT

A system, method and article of manufacture are provided for computer graphics processing. First, pixel data is received including a depth-value. Thereafter, the depth-value is modified based on a depth-component of an algorithm. An operation is subsequently performed on the pixel data taking into account the modified depth-value.

24 Claims, 3 Drawing Sheets

SYSTEM, METHOD AND ARTICLE OF MANUFACTURE FOR Z-TEXTURE MAPPING

FIELD OF THE INVENTION

The present invention relates to computer graphics, and more particularly to mapping of depth values during computer graphics processing.

BACKGROUND OF THE INVENTION

Generally, bump and texture mapping are processes where basic contours of an object are expressed as a polygon in a modeling process and real world map data is used for a rendering process. During the course of bump and texture mapping, a color calculation is performed to incorporate colors onto an object in display coordinate space. This object with the colors is then displayed on a display device.

Prior Art FIG. 1 illustrates the method by which an exemplary bump mapping process is accomplished. As shown, a primitive, i.e. polygon, triangle, etc., is first received with pixel data, as shown in operation 100. Included with such pixel data are normal values and possibly other values associated with the vertices associated with the polygon. These vectors are perspectively and correctly interpolated across the primitive. At each pixel, texture coordinates (also interpolated) are used to look up bump mapping information.

During bump mapping, the aforementioned normal values are modified based on a bump map algorithm using the bump mapping information, as indicated in operation 102 of FIG. 1. In particular, the normal's direction is perturbed as though the surface has been displaced a small amount in the direction of the interpolated normals of the primitive. FIG. 2 illustrates a primitive 200 with a normal 202 that is modified to generate a perturbed normal 204. A bumpy surface is thereby simulated.

Thereafter, lighting operations such as shading or the like are performed on the pixel data using the perturbed normal values instead of the original normal values, as indicated in operation 104. This method gives the appearance of bumps and depressions in the surface. Also at this time, the color calculation may be carried out in order to enhance the color of the pixel.

While the foregoing bump and texture mapping techniques feature the unevenness of a surface and enhance the color of a pixel, they do not work well to reflect any unevenness in shadows cast by or onto the bumpy surface. Further, there are also limitations as to the interaction of geometric objects. These drawbacks are mainly due to the fact that conventional bump and texture mapping processes have no impact on the z-value of the pixel.

There is thus a need for a texture/bump mapping scheme during graphic processing that overcomes these drawbacks for providing a more realistic rendered image.

DISCLOSURE OF THE INVENTION

A system, method and article of manufacture are provided for computer graphics processing. First, pixel data is received including a depth-value, i.e. z-value, w-value, etc. Thereafter, the depth-value is modified based on a depth-component of an algorithm. An operation is subsequently performed on the pixel data taking into account the modified depth-value.

In one embodiment of the present invention, the operation may include a lighting operation. It should be noted, however, that the operation may take any form such as a hidden surface calculation, shadow map operation, etc. As an option, the algorithm may include a bump map algorithm, or any other desired algorithm. Still yet, the algorithm may include a projection transformation of a bump mapping algorithm.

In another embodiment of the present invention, the pixel data may further include a normal value, wherein the normal value is also modified. The present invention thus allows more realistic rendering in those cases where accurate depth-values are important. In particular, Z-buffered intersections of Z-bumped triangles have rough intersections rather than the normal line of intersection. Another example of use of the present technique is in shadow calculations. Z-bumped triangles may cast and receive bumpy shadows in contrast with simple lines of shadow.

Another general utility of this technique is in the use of bump mapping as a proxy for geometry. The corrected depth-values improve the accuracy of the proxy without very significantly increasing the rendering cost.

The various embodiments permit the modification of the depth-value associated with each pixel. In use, the depth-value is modified based on some pre-projection amount. In one application, this depth-value modification may correspond to the displacement used to modify the normal for lighting purposes. The modified depth-value could also be used in conjunction with a shadow buffer algorithm to more accurately model shadows cast by, or cast onto a bump mapped primitive.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

DESCRIPTION OF THE PREFERRED EMBODIMENTS

Bump and texture mapping are techniques to add more realism to synthetic images. Texture mapping adds realism by attaching images to geometric surfaces. Bump mapping adds per-pixel surface relief shading, increasing the apparent complexity of the surface. Surfaces that should have associated fine grain details, small-scale geometric features, roughness, etc. are good candidates for bump mapping.

A bump map is an array of scalar or vector values that represents an object's features on a small scale. A custom renderer is used to map these height values into changes in the local surface normal. These perturbed normals are combined with the surface normal, and the results are used as inputs to a lighting equation at each pixel. In addition to using perturbed normals in such a manner, the present invention further modifies depth-values to enhance graphics processing. It should be noted that one embodiment of the present invention may optionally modify z-values using a related, but separate map of scalar displacements, similar to traditional bump maps.

Figure 1:
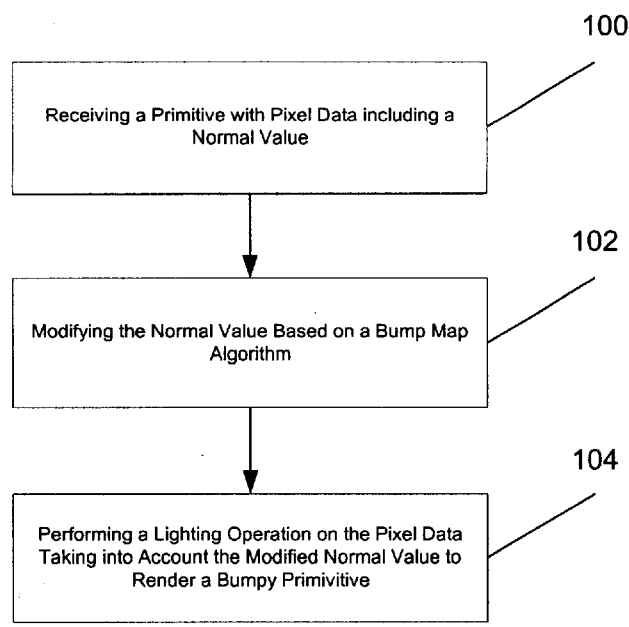
FIG. 1 illustrates a bump mapping method of a prior art computer graphics processing system.
Figure 2:
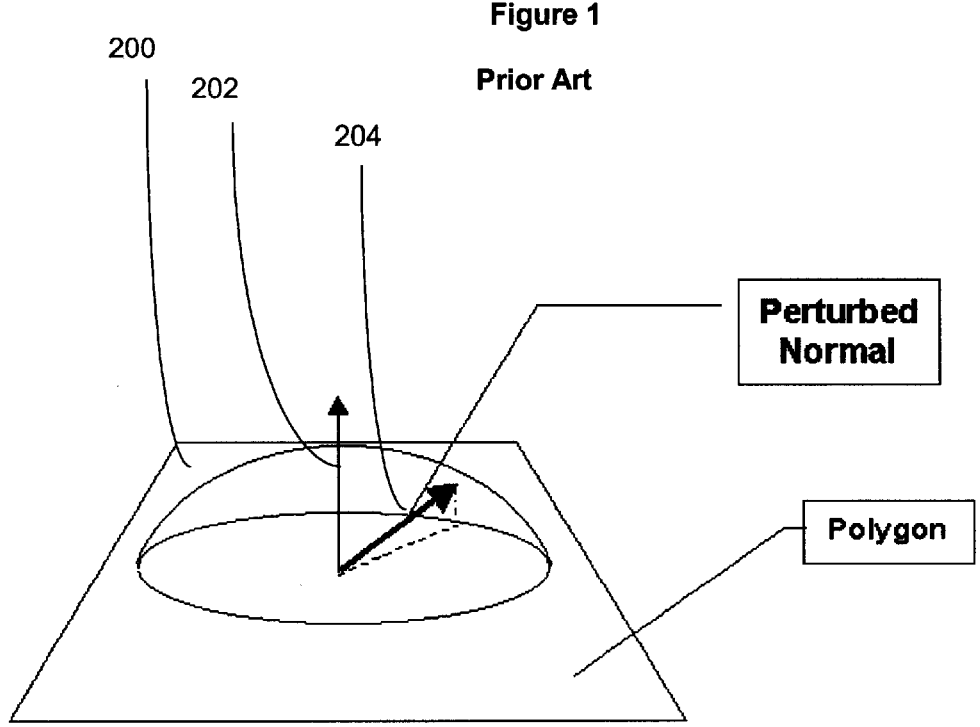
FIG. 2 illustrates a primitive with a normal that is modified to generate a perturbed normal in accordance with a prior art bump mapping method.
Figure 3:
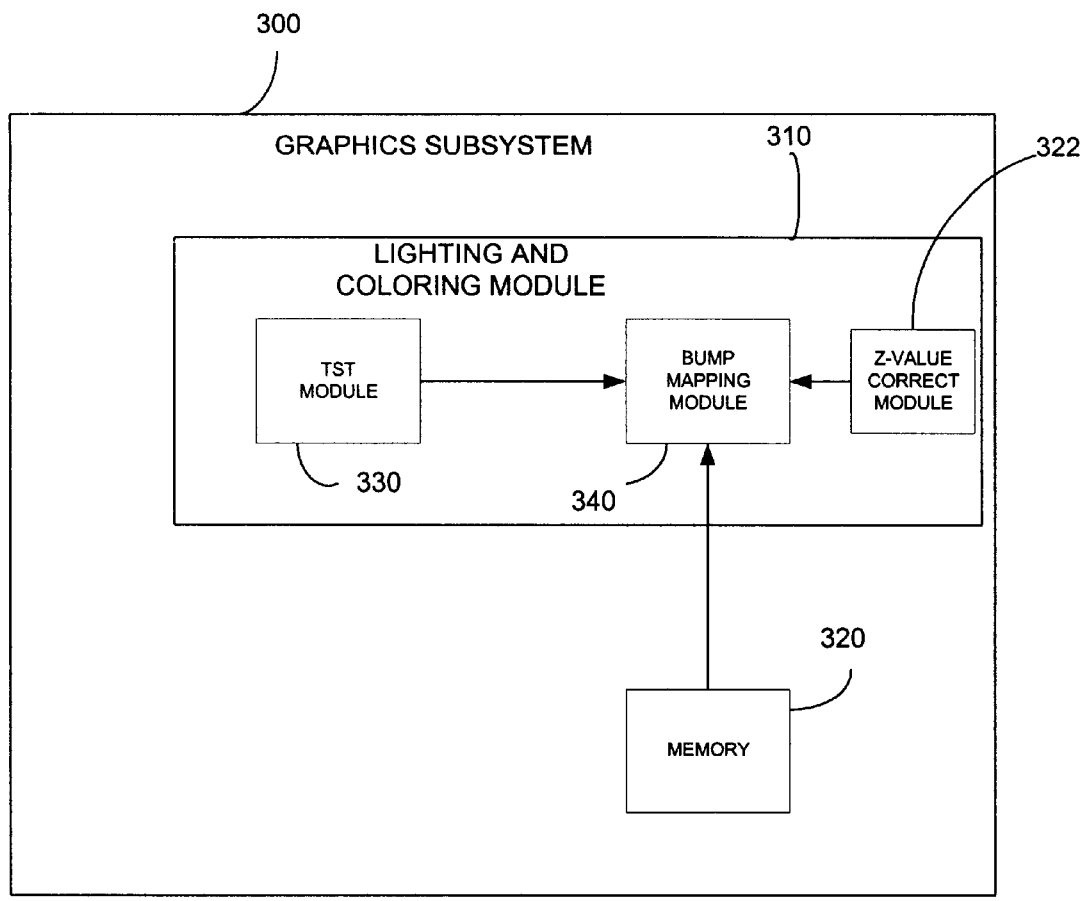
FIG. 3 is a schematic diagram showing an exemplary graphics subsystem implementing bump mapping in tangent space according to the present invention.

FIG. 3 is a schematic diagram showing an exemplary graphics subsystem 300 implementing bump mapping in tangent space according to the present invention. A lighting and coloring module 310 includes a tangent space transform (TST) module 330 and a bump mapping module 340 which operate in a manner that is well known to those of ordinary skill. The graphics subsystem 300 further includes a depth-value correction module 322. The manner in which the depth-value correction module 322 operates will be set forth hereinafter in greater detail. Also included is a memory 320 that stores output produced by the bump mapping module 340 in addition to output produced by the depth-value correction module 322.

The bump mapping module 340 and memory 320 work together to store bump maps by storing a normal vector in a texture map. Conventional RGB values describe a normal vector relative to a coordinate frame defined at the vertices of the primitive, i.e. triangle. Three vectors including tangent, normal, and binormal vectors are interpolated, and the vector read from the texture map is then rotated by taking its dot product with each of the interpolated vectors, in turn. The result is the bump mapped normal which may be then processed by the lighting and coloring module 310 in a conventional manner.

Figure 4:
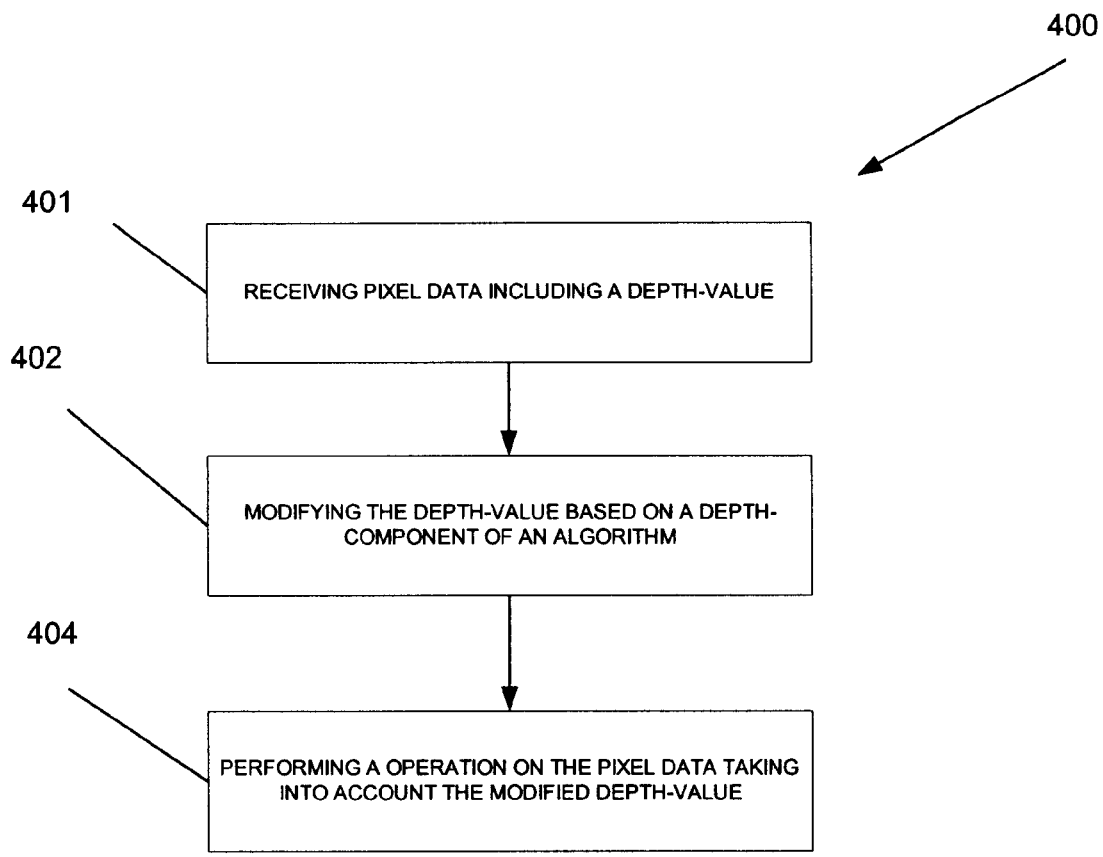
FIG. 4 is a flowchart illustrating a method for modifying depth-values in addition to the normal values during bump mapping in accordance with one embodiment of the present invention.

FIG. 4 is a flowchart 400 illustrating a method for computer graphics processing using the depth-value correction module 322 of FIG. 3. First, in operation 401, pixel data is received including a depth-value. It should be noted that the depth value may include, but is not limited to a z-value, w-value, and/or any other value indicative of depth at least in part.

Thereafter, the depth-value is modified based on a depth-component of an algorithm. See operation 402. Such algorithm may include a bump map algorithm, texturing algorithm, etc. It should be noted, however, that any other desired algorithm may be utilized.

An operation is subsequently performed on the pixel data taking into account the modified depth-value, as indicated in operation 404. In one embodiment of the present invention, the operation may include a lighting operation. It should be noted, however, that the operation may take any form such as a hidden surface (z-test) calculation, shadow map operations, etc. A hidden surface calculation may determine visibility of various objects or portions thereof on the display device. Shadow map operations determine visibility with respect to another viewpoint such as a light source, thus permitting shadowing. During use, the foregoing operations function in a conventional manner, with the exception of using a modified depth-value as opposed to the original depth-value.

The technique for modifying or correcting the depth-values can be derived by perturbing eye-space value $p_e$ using Equation #1.

$$p'_e = p_e + \Delta n_e \qquad \text{Equation \#1}$$

Perturbed eye-space value $p'_e$ may then be run through a conventional projection transform, $T_{proj}$, associated with a viewing transformation that transforms the depth values from eye space to clip space. Clip-space $z_c$ and $w_c$ are thus extracted.

Thereafter, $z_c$ and $w_c$ are modified rendering $z'_c$ and $w'_c$ which are defined by Equations #2.

$$z'_c = z_c + \Delta(n \cdot T_{proj}[3])$$

$$w'_c = w_c + \Delta(n \cdot T_{proj}[4]) \qquad \text{Equation \#2}$$

To perform per pixel calculation, $Z_c$ and $n \cdot T_{proj}[3]$ are iterated, and the value of $\Delta$ is read from a texture map. In some cases, bump mapping may be used in conjunction with displacement mapping. The displacement mapping may occur at one level of detail and filtering. Since the z-texture contains total displacements, there may be a mechanism to take this partial (filtered) displacement into account. In such a situation, the vertices of the triangle may have already sampled the bump map once, and that earlier displacement may be subtracted from $\Delta$ in Equations #2. The result is set forth in Equations #3.

$$z'_c = z_c + \Delta_B(n \cdot T_{proj}[3]) - \Delta_D(n \cdot T_{proj}[3])$$

$$w'_c = w_c + \Delta_B(n \cdot T_{proj}[4]) - \Delta_D(n \cdot T_{proj}[3]) \qquad \text{Equations \#3}$$

The values $\Delta_D$ are per vertex displacements already applied. The values $\Delta_B$ are values read in from the z-texture map.

It should be noted that the final depth value used and stored in the frame buffer may be computed by taking $z_c/w_c$ with some appropriate scale and bias to place it in window coordinates. Further information regarding this chain of transformations may be found in the OpenGL® specification. Further, it should be understood that modifying the depth value may allow the lighting operation to display the interaction of displayed objects. Further, the modified depth value may allow the lighting operation to display bumpy shadows when applied to a typical shadow algorithm.

The present embodiment thus permits the per-pixel adjustment of the depth value of a polygon. The depth value of a polygon normally varies linearly, i.e. the polygon is planar. The present embodiment represents a mechanism by which the depth value is adjusted using a map, and the amount of adjustment is proportional/correct based on pre-projection coordinates. In effect, the modification has the projection transformation applied to it. It should be noted that this technique may be applied in contexts beyond bump mapping.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for computer graphics processing, comprising:

modifying a depth-value based on a depth-component of an algorithm; and performing an operation on pixel data taking into account the modified depth-value;

wherein the depth-value includes a clip-space z-value ($z_c$), and the z-value is modified utilizing the equation:

$$z_c + \Delta(n \cdot T_{proj}[3]),$$

where $\Delta$ includes a value read from a texture map, $T_{proj}[3]$ includes a projection transform, and n includes a number.

2. The method as recited in claim 1, wherein the pixel data further includes a normal value, and further comprising modifying the normal value.

3. The method as recited in claim 1, wherein the operation includes a lighting operation.

4. The method as recited in claim 3, wherein modifying the depth-value based on the depth-component of the algorithm allows the lighting operation to display bumpy shadows.

5. The method as recited in claim 3, wherein modifying the depth-value based on the depth-component of the algorithm allows the lighting operation to display the interaction of displayed objects.

6. The method as recited in claim 1, wherein the operation includes a hidden surface calculation.

7. The method as recited in claim 1, wherein the operation includes a shadow mapping operation.

8. A computer program embodied on a computer readable medium for computer graphics processing, comprising:
  a code segment for modifying a depth-value based on a depth-component of an algorithm; and
  a code segment for performing an operation on pixel data taking into account the modified depth-value;
  wherein the depth-value includes a clip-space z-value ($z_c$), and the z-value is modified utilizing the equation:

$$z_c + \Delta(n \cdot T_{proj}[3]),$$

where $\Delta$ includes a value read from a texture map, $T_{proj}[3]$ includes a projection transform, and n includes a number.

9. The computer program as recited in claim 8, wherein the pixel data further includes a normal value, and further comprising modifying the normal value.

10. The computer program as recited in claim 8, wherein the operation includes a lighting operation.

11. The computer program as recited in claim 10, wherein modifying the depth-value based on the depth-component of the algorithm allows the lighting operation to display bumpy shadows.

12. The computer program as recited in claim 10, wherein modifying the depth-value based on the depth-component of the algorithm allows the lighting operation to display the interaction of displayed objects.

13. The computer program as recited in claim 8, Wherein the operation includes a hidden surface calculation.

14. The computer program as recited in claim 8, wherein the operation includes a shadow mapping operation.

15. A system for computer graphics processing, comprising:
  a module for modifying a depth-value based on a depth-component of an algorithm, and performing an operation on pixel data taking into account the modified depth-value;
  wherein the depth-value includes a clip-space z-value ($z_c$), and the z-value is modified utilizing the equation:

$$z_c + \Delta(n \cdot T_{proj}[3]),$$

where $\Delta$ includes a value read from a texture map, $T_{proj}[3]$ includes a projection transform, and n includes a number.

16. The system as recited in claim 15, wherein the pixel data further includes a normal value, and further comprising modifying the normal value.

17. The system as recited in claim 15, wherein the operation includes a lighting operation.

18. The system as recited in claim 17, wherein modifying the depth-value based on the depth-component of the algorithm allows the lighting operation to display bumpy shadows.

19. The system as recited in claim 17, wherein modifying the depth-value based on the depth-component of the algorithm allows the lighting operation to display the interaction of displayed objects.

20. The system as recited in claim 15, wherein the operation includes a hidden surface calculation.

21. The system as recited in claim 15, wherein the operation includes a shadow mapping operation.

22. A method for computer graphics processing, comprising:
  receiving pixel data including a depth-value, wherein the pixel data further includes a normal value;
  modifying the normal value;
  modifying the depth-value based on a depth-component of a bump mapping algorithm; and
  performing a lighting operation on the pixel data taking into account the modified depth-value and the modified normal value;
  wherein modifying the depth-value allows the lighting operation to display bumpy shadows, and the interaction of displayed objects;
  wherein the depth-value includes a clip-space z-value ($z_c$), and the z-value is modified utilizing the equation:

$$z_c + \Delta(n \cdot T_{proj}[3]),$$

where $\Delta$ includes a value read from a texture map, $T_{proj}[3]$ includes a projection transform, and n includes a number.

23. A method for computer graphics processing, comprising:
  receiving, pixel data including a depth-value;
  modifying the depth-value based on a depth-component of an algorithm; and
  performing an operation on the pixel data taking into account the modified deth-value;
  wherein the depth-value includes a clip-space z-value ($z_c$), and the z-value is modified utilizing the equation:

$$z_c + \Delta(n \cdot T_{proj}[3]),$$

where $\Delta$ includes a value read from a texture map, $T_{proj}[3]$ includes a projection transform, and n includes a number.

24. A method for computer graphics processing, comprising:
  receiving pixel data including a depth-value;
  modifying the depth-value based on a depth-component of an algorithm; and
  performing an operation on the pixel data taking into account the modified depth-value;
  wherein the depth-value includes a clip-space w-value ($w_c$), and the w-value is modified utilizing the equation:

$$w_c + \Delta(n \cdot T_{proj}[4]),$$

where $\Delta$ includes a value read from a texture map, $T_{proj}[4]$ includes a projection transform, and n includes a number.

* * * * *

UNITED STATES PATENT AND TRADEMARK OFFICE
CERTIFICATE OF CORRECTION

PATENT NO. : 6,731,298 B1
APPLICATION NO. : 09/678111
DATED : May 4, 2004
INVENTOR(S) : Moreton et al.

Page 1 of 1

It is certified that error appears in the above-identified patent and that said Letters Patent is hereby corrected as shown below:

Col. 5, line 45 replace "Wherein" with --wherein--;
Col. 6, line 40 replace "deth-value" with --depth-value--.

Signed and Sealed this

Ninth Day of February, 2010

David J. Kappos
*Director of the United States Patent and Trademark Office*